(12) United States Patent
Weiser et al.

(10) Patent No.: US 6,705,460 B2
(45) Date of Patent: Mar. 16, 2004

(54) MODULAR CONVEYOR BELT

(75) Inventors: David C. Weiser, River Ridge, LA (US); Andrew A. Corley, River Ridge, LA (US); Mitchell G. Pansano, Jr., Harahan, LA (US)

(73) Assignee: Laitram L.L.C., Harahan, LA (US)

( * ) Notice: Subject to any disclaimer, the term of this patent is extended or adjusted under 35 U.S.C. 154(b) by 0 days.

(21) Appl. No.: 10/127,448

(22) Filed: Apr. 23, 2002

(65) Prior Publication Data

US 2003/0196876 A1 Oct. 23, 2003

(51) Int. Cl.$^7$ ............................................. B65G 17/06
(52) U.S. Cl. ........................................ 198/850; 198/853
(58) Field of Search ........................... 198/850, 851, 198/852, 853

(56) References Cited

U.S. PATENT DOCUMENTS

| | | | | |
|---|---|---|---|---|
| 3,513,780 A | * | 5/1970 | Jenkins | 198/853 |
| 4,586,601 A | * | 5/1986 | Hodlewsky | 198/853 |
| 5,628,393 A | | 5/1997 | Steeber et al. | 198/699 |
| 5,690,210 A | * | 11/1997 | Layne | 198/853 |
| 6,041,917 A | * | 3/2000 | Layne | 198/853 |
| 6,209,716 B1 | * | 4/2001 | Bogle et al. | 198/852 |
| 6,296,110 B1 | | 10/2001 | van Zijderveld et al. | 198/635 |
| 6,398,015 B1 | * | 6/2002 | Sedlacek et al. | 198/779 |
| 6,494,312 B2 | * | 12/2002 | Costanzo | 198/779 |
| 6,523,680 B2 | * | 2/2003 | Guldenfels | 198/853 |

OTHER PUBLICATIONS

HabasitLINK Product Guide by Habasit Belting, Inc. of Suwanee, Georgia, Feb., 2002, 4 pages.
Intralox Engineering Manual by Intralox Inc of Harahan, Louisiana, 2001, pp. 2–14,–19,–30,–33,–34,–35,–43,–50, –52,–53,–54,–55,–63,–67,–73,–74,–81,–94,–104,–105,–113.
"Uni MPB Meat Processing Belt" by uni–chains International A/S of Englandsvej, DK, 1999.

* cited by examiner

Primary Examiner—Douglas Hess
(74) Attorney, Agent, or Firm—Michael Tobias

(57) ABSTRACT

A module for a modular conveyor belt has a plurality of projections on its top surface for supporting objects. The module may include drainage openings through which fluids can drain from objects disposed on the projections. The projections can be used to prevent objects from adhering to the top surface of the module and/or to immobilize the objects during movement of a conveyor belt including the module.

23 Claims, 12 Drawing Sheets

MODULAR CONVEYOR BELT

BACKGROUND OF THE INVENTION

1. Field of the Invention

This invention relates to a modular conveyor belt suitable for carrying fruit, vegetables, or other items having a tendency to adhere to the surface of a conveyor belt.

2. Description of the Related Art

A modular conveyor belt is a conveyor belt formed from a plurality of sections (referred to as modules) pivotably connected to each other end to end in series. Modular conveyor belts are popular because the length of such conveyor belts can be readily adjusted by varying the number of modules making up the conveyor belts. Furthermore, a modular conveyor belt is easy to repair when worn or damaged by simply replacing any worn or damaged modules without it being necessary to replace the entire conveyor belt.

Food products such as fruits and vegetables, especially after having been sliced, have a tendency to adhere to the upper surface of a conveyor belt due to suction between the products and the conveyor belt, the suction usually resulting from the natural juices of the food products, water, or other forms of moisture on the surface of the food products. This adhesion can make it difficult to offload the products from the conveyor belt. It has been found that the provision of small projections on the top surface of a conveyor belt can significantly reduce such adhesion by elevating the products being carried by the conveyor belt above the top surface of the conveyor belt and enabling air to pass beneath the products. This decreases the area of contact between the products and the conveyor belt and thereby reduces the overall adhesive force due to suction.

However, existing conveyor belts with projections on their top surfaces are not completely satisfactory. Projections have conventionally been omitted from the regions of modules adjoining the pivotable joints between modules to prevent the projections from interfering with pivoting movement of adjoining modules. As a result, the distribution of projections on such modules is not uniform, and fruits and vegetables can easily adhere to the modules in the regions where there is a lower concentration of projections. In addition, existing conveyor belts with projections do not provide for drainage of fluids through the conveyor belts. This makes it difficult to transfer wet fruits and vegetables directly from a water tank and may necessitate a separate dewatering step prior to the fruits and vegetables being placed onto the conveyor belt.

SUMMARY OF THE INVENTION

Accordingly, the present invention provides a module for a modular conveyor belt which permits a more uniform distribution of projections on its upper surface than existing conveyor belt modules.

The present invention also provides a module for a modular conveyor belt which enables fluids to drain through the conveyor belt from objects supported by the conveyor belt.

The present invention further provides a modular conveyor belt including such modules and a method of assembling a modular conveyor belt.

The present invention additionally provides a method of operating a modular conveyor belt and a method of assembling a conveyor belt.

According to one form of the present invention, a module for a modular conveyor belt includes projections for supporting objects above a surface of the module. The module may also include drainage openings for drainage of fluid from objects supported on the projections. The projections can prevent objects from adhering to the surface of the module due to suction, while the drainage openings allow fluid to drain from the objects and off the module while they are being transported by the module so that the objects can be transferred directly from a water tank onto the module without the need for a dewatering step.

The projections preferably extend to the vicinity of the lengthwise ends of the module so as to provide good uniformity of the distribution of the projections. At the same time, the projections are preferably disposed so as to permit significant reverse pivoting of adjoining modules during operation of a conveyor belt containing the modules.

The drainage openings are not restricted to any particular shape and may communicate between the upper side of the module and any portion of the module from which it is convenient to discharge fluid. In preferred embodiments, the drainage openings extend through the thickness of a module between its top and bottom sides.

According to another form of the present invention, a module for a modular conveyor belt includes a plurality of lengthwise ribs and a stopping member extending in a widthwise direction of the module into a gap between two adjoining lengthwise ribs. When two modules are to be connected in series, the lengthwise ribs of one module are inserted between the lengthwise ribs of the adjoining module until a lengthwise rib on one module contacts a stopping member on the other module. In this state, bores in the two modules are aligned with each other so that a hinge pin can be easily passed through the bores, thereby enabling efficient assembly of a conveyor belt.

A module according to the present invention is not restricted to any particular type or shape. In preferred embodiments, it is a grid-type module in which the top surface of the module is defined by a grid of intersecting members extending in the lengthwise and widthwise directions of the module.

A module according to the present invention can be used to support a wide variety of objects, but it is particularly advantageous when used to transport uncooked food products, a few examples of which are sliced peaches, sliced potatoes, sliced or diced carrots, sliced apples, sliced tomatoes, beets, individual kernels of corn, shelled peas, and slabs of meat.

These and other features of the present invention will be described below while referring to the accompanying drawings.

DESCRIPTION OF PREFERRED EMBODIMENTS

Figure 1:
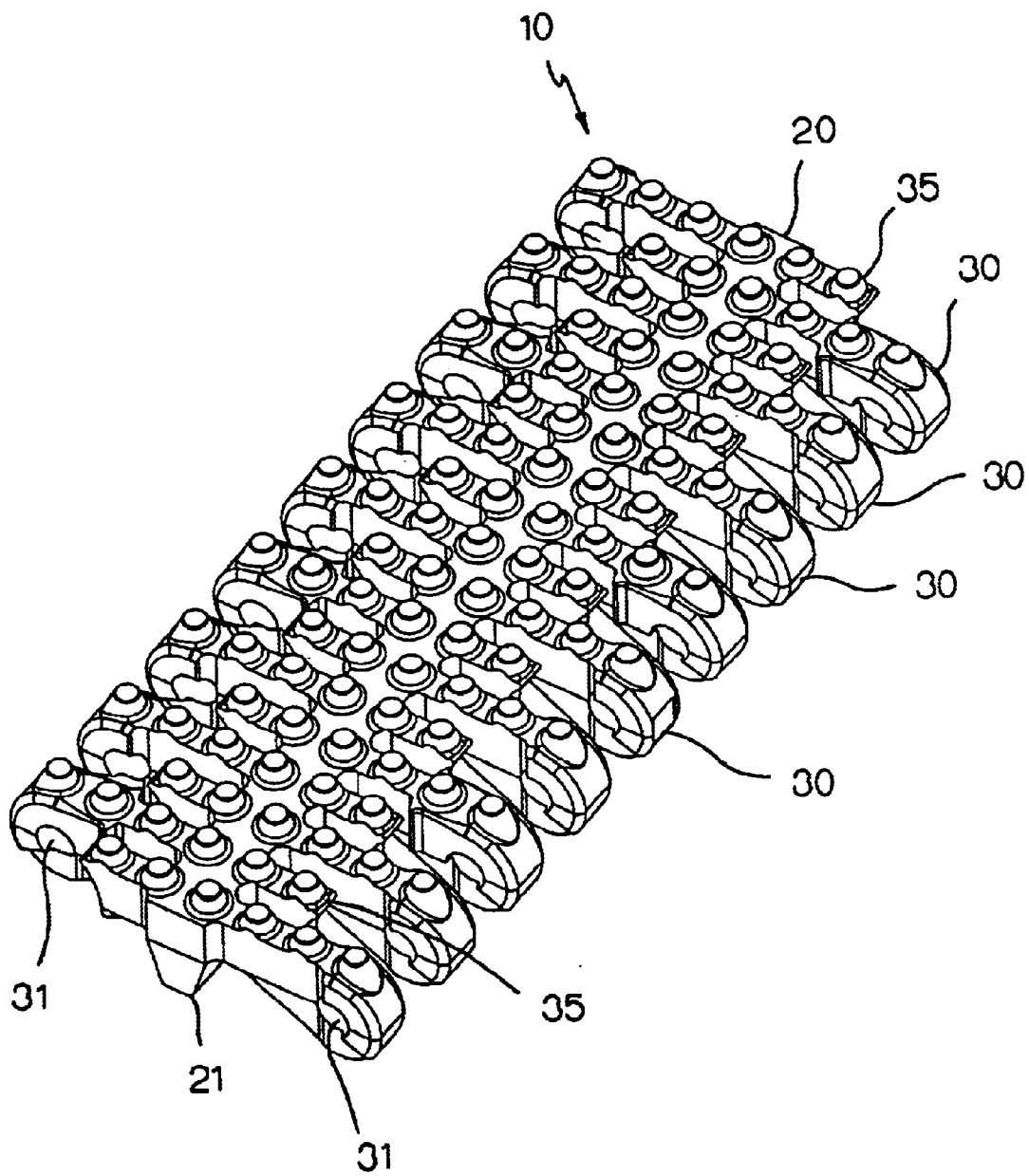
FIG. 1 is an axonometric view of an embodiment of a module of a modular conveyor belt according to the present invention.
Figure 2:
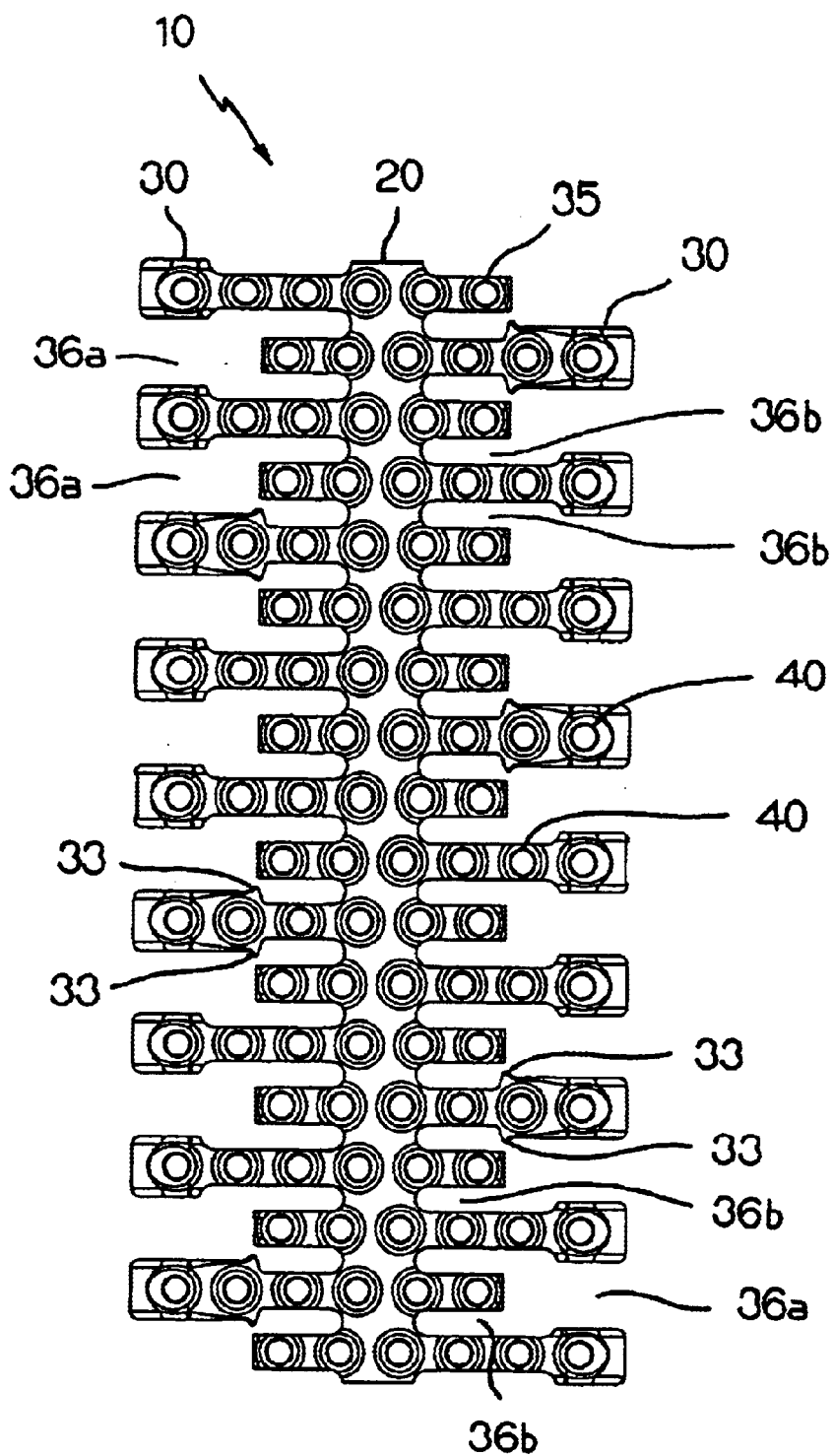
FIG. 2 is a plan view of the module of FIG. 1.

A modular conveyor belt according to the present invention includes a plurality of modules pivotably connected to each other end to end in series, typically to form an endless belt. FIGS. 1–7 illustrate one embodiment of a module 10 for a modular conveyor belt according to the present invention. FIGS. 1 and 2 show a single module 10, while FIGS. 3–7 show various views of two identical modules 10 connected to each other in series. The overall geometry of the module 10 (such as its length, its width, the shape of its lower portion, the shape of its lengthwise ends) may be similar to that of an existing module. For example, the illustrated module 10 is similar in overall geometry to a Series 800 Flush Grid Interior Module available from Intralox, Inc. of Harahan, La.

The illustrated module 10 is in the form of a grid with a generally rectangular outer periphery. It includes a central portion in the form of a transverse rib 20 extending in a widthwise direction of the module 10 and a plurality of lengthwise ribs 30 and 35 extending from the transverse rib 20 parallel to each other in the lengthwise direction of the module 10 (the direction in which the module 10 travels along a path as part of a conveyor belt) and laterally (such as perpendicularly) with respect to the transverse rib 20. The lengthwise ribs 30 and 35 include a plurality of first lengthwise ribs 30 and a plurality of second lengthwise ribs 35 which alternate with the first lengthwise ribs 30 in the widthwise direction of the module 10 and which are shorter than the first lengthwise ribs 30 as measured in the lengthwise direction of the module 10. In the present embodiment, each of the first lengthwise ribs 30 is aligned with one of the second lengthwise ribs 35 on the opposite side of the transverse rib 20 in the lengthwise direction of the module 10. However, alignment of the lengthwise ribs 30 and 35 is not necessary. The first lengthwise ribs 30 all have the same length, so the outer ends of the first lengthwise ribs 30 at either lengthwise end of the module 10 are flush with a straight line parallel to the transverse rib 20. This gives the module 10 a generally rectangular outline. However, other shapes are possible by varying the lengths of the first lengthwise ribs 30. The top surfaces of the transverse rib 20 and the lengthwise ribs 30 and 35 are substantially flat and flush with a common plane, but it is also possible for the top surfaces to be sloping to facilitate drainage.

In the present embodiment, all of the lengthwise ribs 30 and 35 extend in a straight line perpendicular to the transverse rib 20, but the lengthwise ribs may have a different shape as viewed in plan, such as curved or crank shaped, and they need not be parallel to each other.

Adjoining first lengthwise ribs 30 are spaced from each other in the widthwise direction of the module 10 by a gap 36a which communicates with the front or rear lengthwise end of the module 10. Each gap 36a is large enough to receive the outer end (the end remote from the transverse rib 20) of one of the first lengthwise ribs 30 of an identical module while enabling the outer end to pivot about an axis within the gap 36a. The gaps 36a enable the front end or rear end of each module 10 to interfit with the rear end or front end, respectively, of an identical module 10 so that the modules 10 can be connected in series with each other. In addition, each first lengthwise rib 30 is spaced in the widthwise direction of the module 10 from the adjoining second lengthwise rib 35 by a gap 36b which communicates with one of the lengthwise ends of the module 10 through one of gaps 36a. The gaps 36b define drainage openings through which fluid can pass to provide drainage for objects supported atop the module 10. The gaps 36b extend through the thickness of the module 10 between its top and bottom sides, but they may communicate between the top side and any other portion of the module 10 from which it is convenient to discharge fluid. The shape of the drainage openings defined by the gaps 36b is not restricted.

Figure 3:
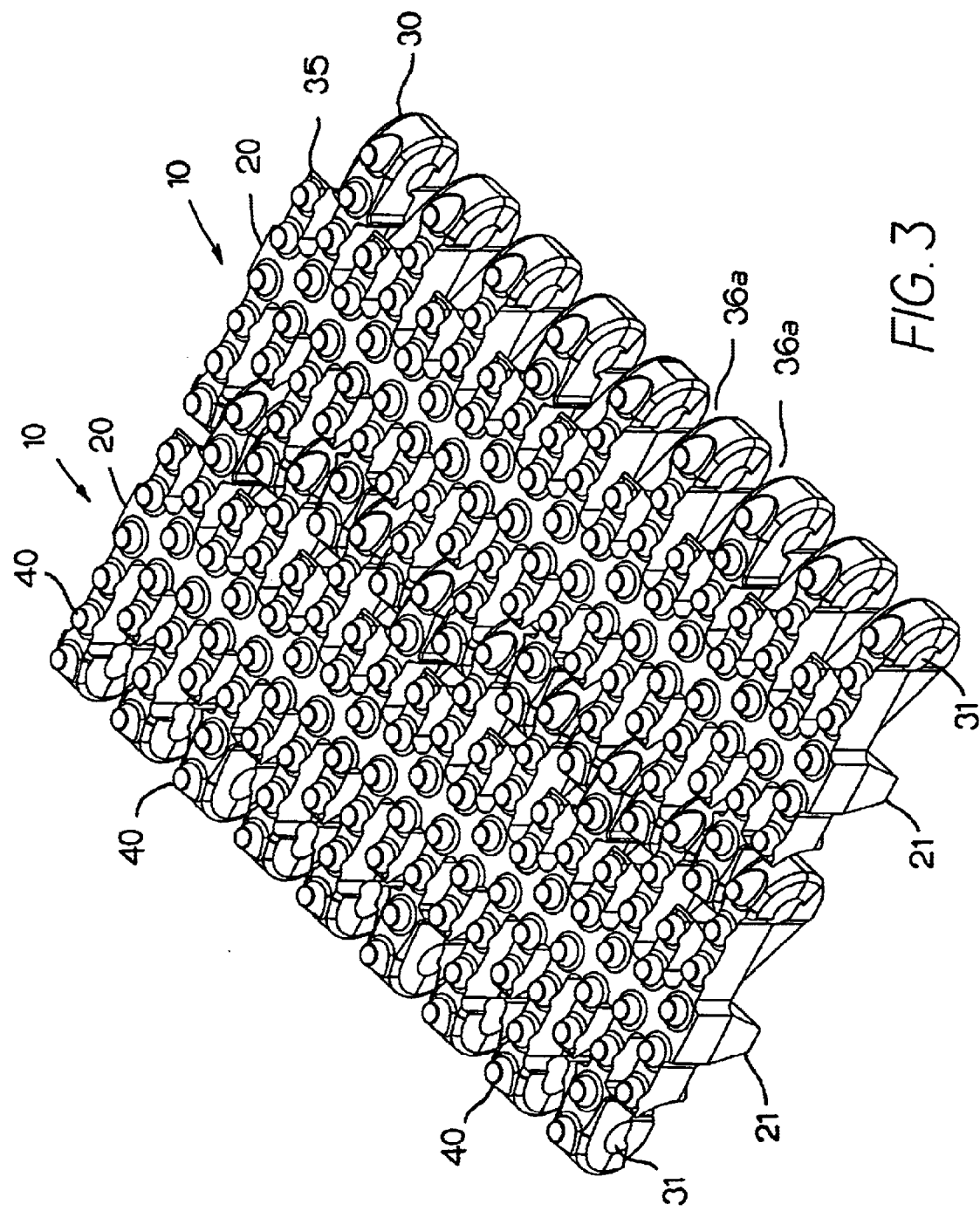
FIG. 3 is an axonometric view of two modules like the one shown in FIG. 1 connected in series.
Figure 4:
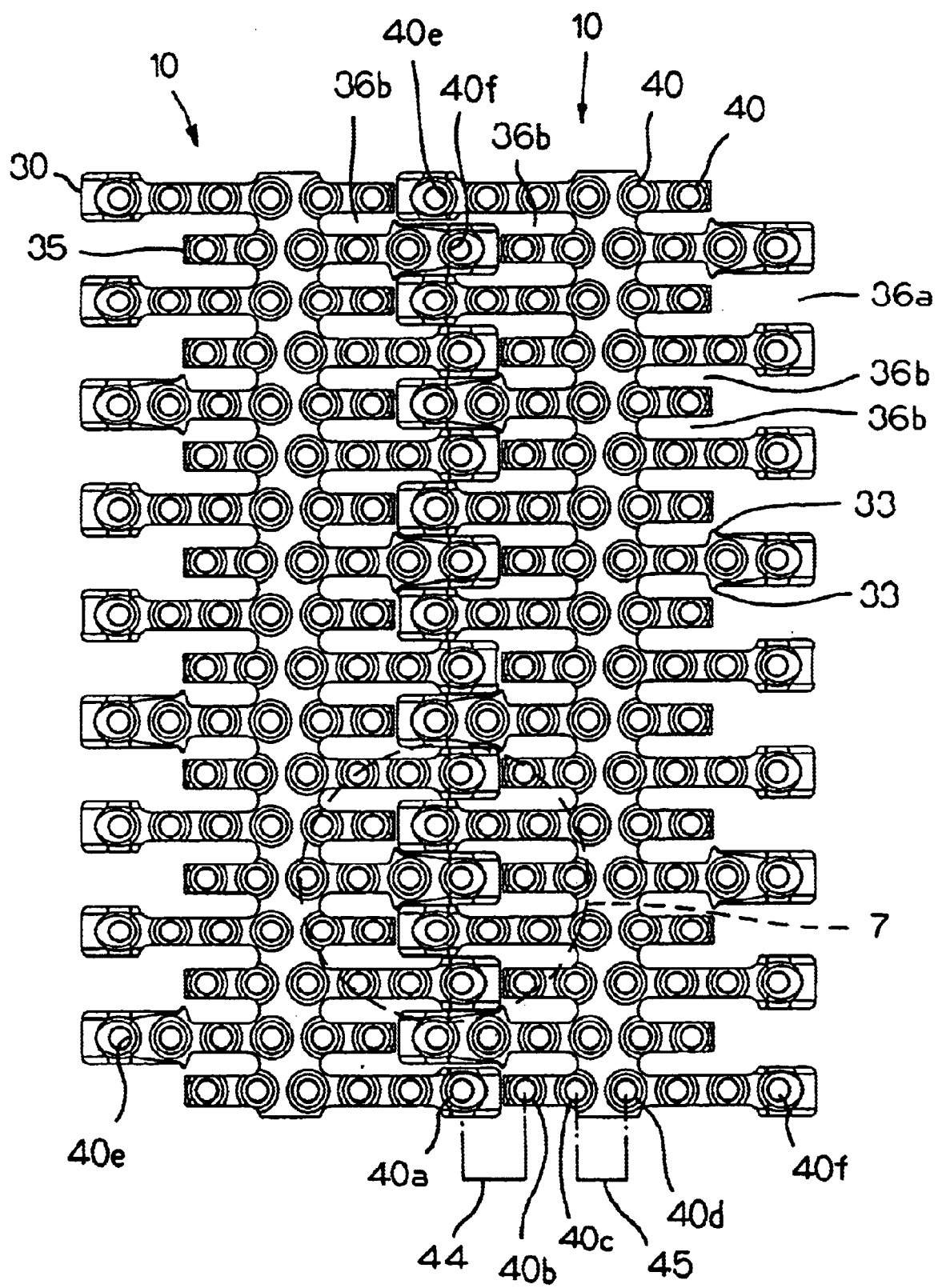
FIG. 4 is a plan view of the two modules of FIG. 3.
Figure 5:
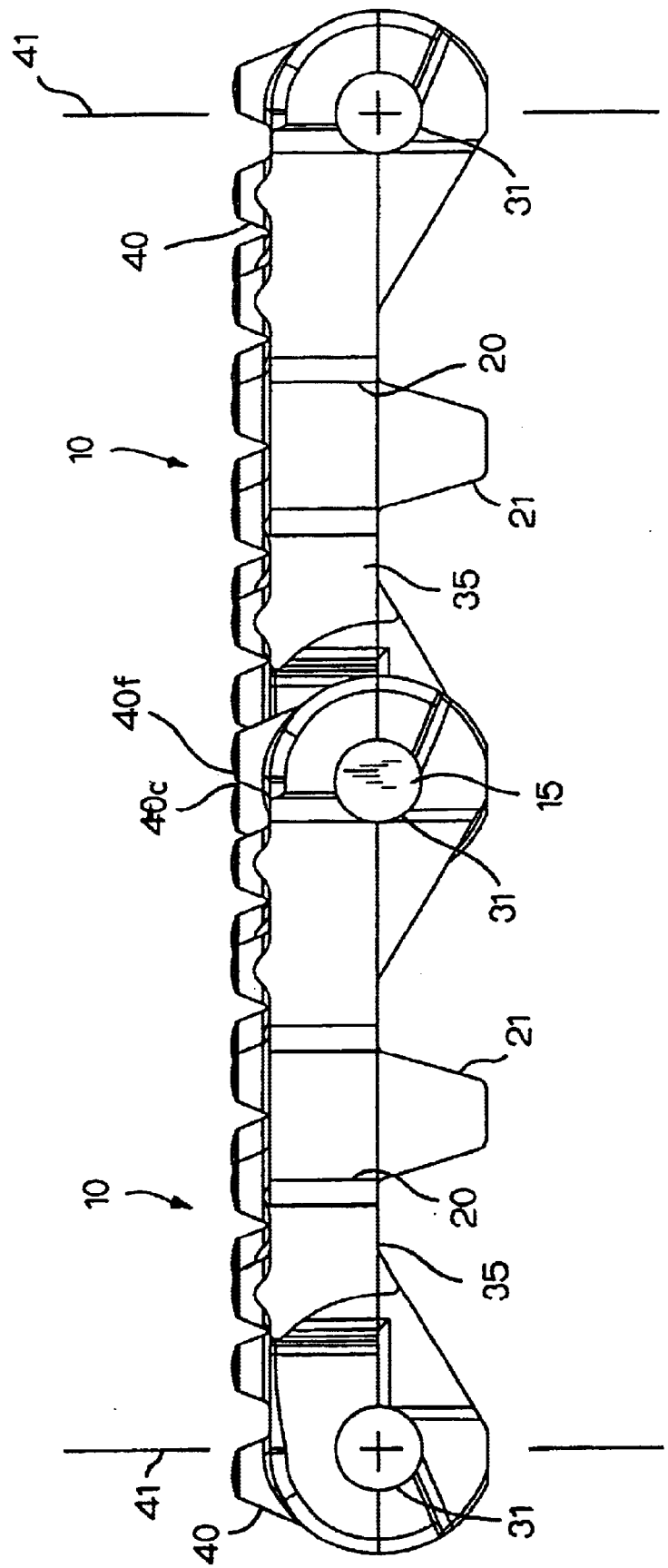
FIG. 5 is a side elevation of the two modules of FIG. 3 in a coplanar state.
Figure 6:
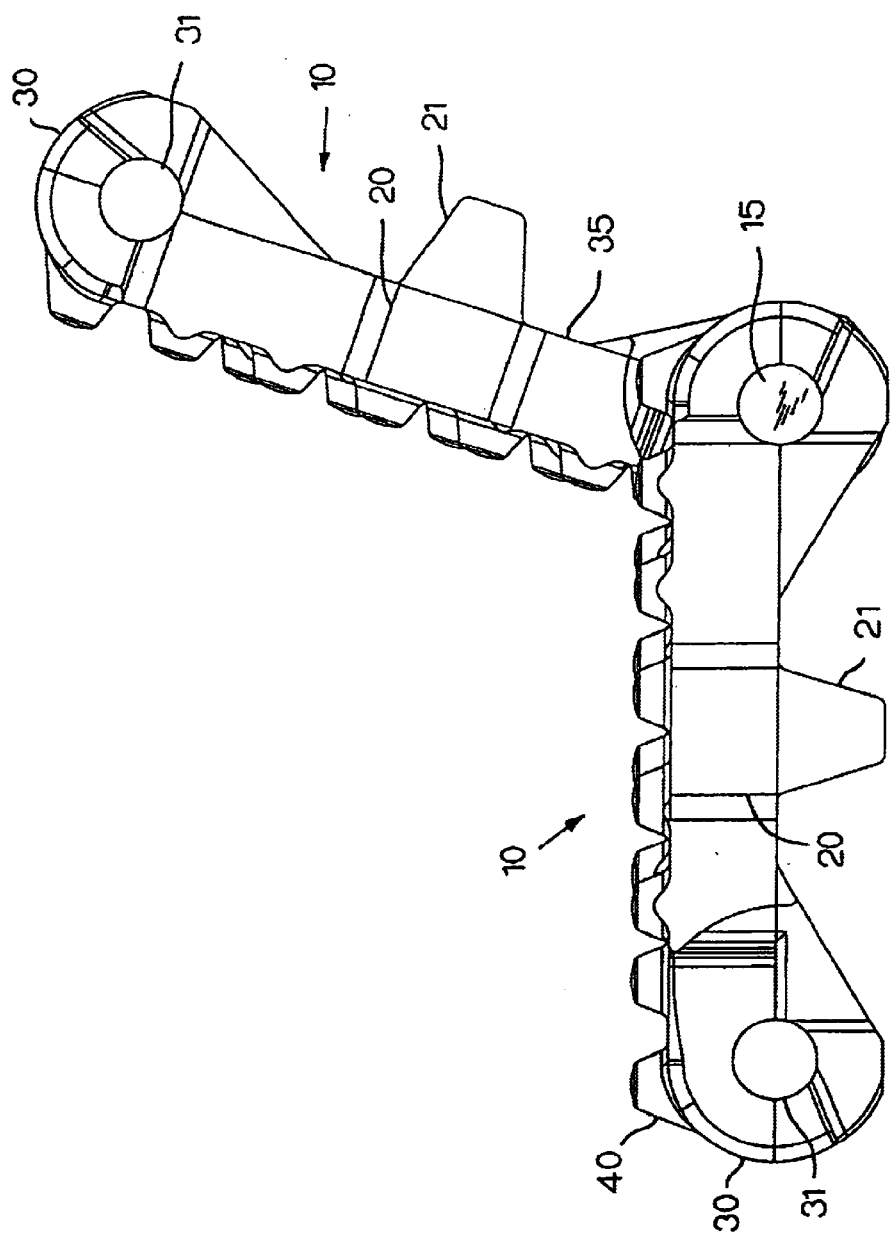
FIG. 6 is a side elevation of the two modules of FIG. 5 when undergoing reverse pivoting with respect to each other.

The outer end of each of the first lengthwise ribs 30 has a circular bore 31 formed therein for rotatably receiving an elongated hinge pin 15 (visible in FIGS. 5 and 6). The plurality of bores 31 at one lengthwise end of the module 10 are aligned with each other, and the plurality of bores 31 at the other lengthwise end of the module 10 are aligned with each other. FIGS. 3–5 show two modules 10 like the one of FIG. 1 arranged in series. Two adjoining modules 10 are disposed with their opposing lengthwise ends interfitting, i.e., with the outer ends of the first lengthwise ribs 30 at one end of one module 10 disposed in the gaps 36a between the outer ends of adjoining first lengthwise ribs 30 at one end of the next module, and with the bores 31 of the first lengthwise ribs 30 at one end of one module 10 aligned with the bores 31 of the first lengthwise ribs 30 at one end of the adjoining module 10. In this state, the hinge pin 15, which may be of conventional structure, is passed through the aligned bores 31 to pivotably connect the adjoining modules 10 to each other.

In FIGS. 3–5, two modules 10 adjoining each other in the lengthwise direction of a conveyor belt are illustrated with their widthwise ends aligned with each other. As described below with respect to FIG. 9, modules 10 adjoining each other in the lengthwise direction of a conveyor belt can also be disposed such that their widthwise ends are offset with respect to each other in the widthwise direction of the conveyor belt.

In the illustrated embodiment, the first lengthwise ribs 30 have a greater width at their outer ends than at their inner ends. The increased width reduces widthwise play between adjoining modules 10 when they are interconnected as described above without it being necessary to narrow the gaps 36b defining the drainage openings. However, the first lengthwise ribs 30 may also have a constant width over their lengths.

A modular conveyor belt is typically driven along a path by a plurality of drive sprockets which can drivingly engage with the lower surface of each module 10 in the conveyor belt. A module of a conveyor belt according to the present invention is not limited to use with any particular type of drive sprocket, so various shapes can be employed for the lower surface of the module 10 in accordance with the type of drive sprocket to be employed. The module 10 of the present embodiment is of the so-called center-driven type in which a drive-sprocket transmits a drive force to the module 10 at a point between the lengthwise ends of the module 10. Alternatively, it may be a hinge-driven type (in which a drive force is transmitted to the module in the vicinity of the hinge pins connecting adjoining modules) or a center and hinge-driven type (which is hinge driven when moving in a first direction and center driven when moving in the opposite direction). A drive sprocket for use with the module 10 of FIG. 1 typically has a plurality of teeth separated by spaces, with each tooth having a notch formed therein. The lower surface of each transverse rib 20 has a downward projection 21 which can engage with any of the notches in the teeth of the drive sprocket. In addition, the lower surface of the outer end of each of the first lengthwise ribs 30 has a shape which enables the outer end to be received in any of the spaces between adjoining teeth of the drive sprocket. Typically a plurality of drive sprockets are mounted on a common drive shaft and spaced from each other along the length of the drive shaft, i.e., in the widthwise direction of the conveyor belt. The drive shaft is rotated by a suitable drive mechanism, examples of which are well known to those skilled in the art.

There are no restrictions on the size of a module according to the present invention. However, it may be advantageous to use dimensions close to that of an existing module to enable a conveyor belt comprising modules according to the present invention to be used interchangeably with an existing conveyor belt on existing drive equipment. As an example of dimensions, if the module 10 of FIG. 1 is intended to be used interchangeably with an existing Series 800 Flush Grid Interior Module manufactured by Intralox, Inc., the module 10 will have a height of approximately 0.625 inches from the top surface of the ribs to its lower end and a pitch of 2 inches measured between the axes of the bores 31 at opposite lengthwise ends of the module 10. The width of the module 10 may be selected in accordance with the desired width of the conveyor belt in which the module 10 is to be employed. The illustrated module 10 has a width of 6 inches.

In contrast to a conventional flush grid module, the illustrated module 10 further includes a plurality of projections 40 formed on the top surface of the ribs 20, 30, and 35 for supporting objects to be transported by the module 10. The projections 40 can be used for a variety of purposes. One possible use is to support objects such as fruits or vegetables above the ribs 20, 30, 35 to prevent the objects from adhering to the ribs, thereby making it easier to offload the objects from the conveyor belt. Another possible use is to immobilize slippery objects being transported by the conveyor belt, such as slabs of meat, and prevent the objects from sliding around on or sliding off the conveyor belt while being transported, particularly when the conveyor belt is on an incline or when the objects are being conveyed through saws or other processing equipment.

The projections 40 may have a variety of shapes. For example, when viewed in plan, the projections 40 may have a curved shape (such as circular or elliptical), a polygonal shape (such as triangular, square, or diamond-shaped), or a shape having a combination of linear and curved portions. However, a curved shape, such as a circular shape, may provide more efficient circulation of air beneath the objects being supported by the projections 40 while providing a given amount of product support. Therefore, in the present embodiment, each projection 40 is a body of revolution about an axis perpendicular to the top surface of the rib on which it is formed. As viewed in elevation, the sides of the projections 40 may be straight (such as conical, frustoconical, or pyramid-shaped), or curved, or they may have a combination of straight and curved portions. The top surface of each projection 40 may also have a variety of shapes, such as flat, pointed, curved, or a combination of different shapes. In the present embodiment, each projection 40 is circular as viewed in plan and has sides which are defined by a truncated cone. The top surface of each projection is curved upwards, with the center of the top surface being slightly higher (such as 0.010 inches higher) than its outer periphery where the top surface meets the sides. When a fairly stiff food product such as sliced uncooked peaches or potatoes is supported atop the top surface, the food product deforms only slightly to the shape of the top surface. Therefore, the upwardly curved shape reduces the contact area between the projection and the food product so that the contact approaches point contact, thereby further reducing the adhesion between the product and the projections due to suction. When the projections 40 are intended to immobilize objects on the module 10, a more pointed profile (such as conical) may be suitable for the projections 40 than when they are intended to support objects above the ribs without necessarily immobilizing the objects.

The spacing between projections 40 can be selected based on the size of the objects to be supported by the conveyor belt. When the projections 40 are used to prevent objects from adhering to the top surfaces of the ribs, the spacing is preferably small enough that the objects do not fall or sag between the projections 40 by enough to contact the top surfaces of the ribs. At the same time, if the spacing between adjoining projections 40 is extremely small, it may become difficult for fluid drained from products supported atop the projections 40 to flow between the projections 40. When the projections are used to support fairly large food products such as sliced peaches or sliced potatoes, the pitch between adjoining projections 40 in the lengthwise or widthwise direction of the module 10 will typically be at most 0.4 inches. When the projections are used to support smaller products such as shelled peas or individual kernels of corn, the pitch between adjoining projections will typically be at most 0.25 inches. The pitch between adjoining projections 40 is preferably such that the projections 40 can support objects having maximum dimensions of as small as 0.5 inches and more preferably of as small as 0.4 inches without the objects contacting the top surfaces of the ribs, including in a region spanning two modules 10 adjoining each other in the lengthwise direction of a conveyor belt.

When the projections 40 are used to prevent objects from adhering to the top surfaces of the ribs, the height of the projections 40 above the top surfaces of the ribs is preferably large enough to leave an air gap between objects being supported and the upper surface of the ribs, even when the objects are wet, to prevent the formation of suction. For many foods, a height of approximately 0.10 inches has been found to be suitable to provide an adequate clearance while not significantly increasing the overall height of the module 10 to enable it to be used with existing drive equipment for a conveyor belt without projections.

The projections 40 need not all be of the same height, but in the present embodiment, the top surfaces of all the projections 40 of one module 10 have the same height so that when two adjoining modules 10 are coplanar, i.e., when the axes of all the bores 31 of both modules 10 lie in the same plane, the top surfaces of the projections 40 of both modules 10 are coplanar.

The projections 40 may be made of the same material as the other portions of a module 10, or they may be made of or coated with a material different from that used for the other portions of the module 10 in order to provide desired properties, such as a different coefficient of friction or hardness from that needed by other portions of the module 10. However, in the present embodiment, all portions of the module 10 are formed of the same material with the same physical properties. Frequently it is convenient to form the entire module 10, including the projections 40, as a unitary member by a method such as injection molding. However, it is also possible for the projections 40 to be formed separately from the ribs 20, 30, and 35 and then subsequently secured to the ribs, or they may be formed by machining or other cutting process subsequent to molding. There are no particular restrictions on the materials which can be used to form the module 10. Modules for conveyor belts are often formed by injection molding of plastic, but any other material having sufficient strength and durability may instead be employed, such as metals or ceramics.

The projections 40 need not extend over the entire top surface of a module 10. With some conveyor belts, the regions adjoining the widthwise edges of the conveyor belts are not used for supporting objects being carried by the conveyor belts, so projections 40 may be omitted from such regions. The shape of the module 10 may also vary over its upper surface. For example, the regions of a conveyor belt adjoining its widthwise edges may be more in the form of a plate than a grid, and it may have holes for supporting side guards or similar members well known to those skilled in the art.

The projections 40 can be arranged on the ribs of the module 10 in a variety of patterns. In the present embodiment, the projections 40 are arranged in a plurality of parallel lengthwise rows of six projections 40, with a plurality of projections 40 formed on each of the first and second lengthwise ribs 30 and 35. A plurality of the projections 40 overlap each other in the lengthwise direction of the module 10 (such as the outermost projections 40 on the first lengthwise ribs 30 at one lengthwise end of a module 10), and a plurality of the projections 40 are nonoverlapping with respect to each other in the lengthwise direction of the module 10 (such as two projections 40 on the same first lengthwise rib 30). In addition, a plurality of the projections 40 overlap each other in the widthwise direction of the module 10 (such as two projections 40 on the same lengthwise rib 30 or 35), and a plurality of the projections 40 are nonoverlapping with respect to each other in the widthwise direction of the module 10 (such as two projections 40 on two different first lengthwise ribs 30 or two different second lengthwise ribs 35). When the projections 40 are arranged in lengthwise rows, adjoining projections 40 in the widthwise direction are preferably staggered with respect to each other in the lengthwise direction, i.e., the adjoining projections 40 are different distances from the lengthwise ends of the module 10. In this embodiment, a line connecting the centers of a group of four projections 40 adjoining each other in the lengthwise or widthwise direction describes roughly a nonright parallelogram. This arrangement reduces the area between any group of four projections 40 and provides for maximum product support with a minimum number of projections 40.

A single module 10 may extend across the entire width of a conveyor belt. Alternatively, a plurality of modules, which may be the same or different in structure from one another, can be arranged side by side in the widthwise direction of a conveyor belt to form a conveyor belt of a desired width greater than that of a single module 10.

The open area of a module 10 (the percent of the area of a plane coinciding with the top surface of the ribs 20, 30, and 35 that is unobstructed) is large enough to provide desired drainage of fluid from objects supported on the module 10. Preferably the open area is sufficiently large that wet objects such as cut fruits or vegetables can be transferred directly to atop the module 10 from a water tank without the need for a separate dewatering step. A suitable value for the open area will depend upon the amount of water or other fluid to be drained from the objects to be transported by the module 10. Typically, the open area for a plurality of modules 10 connected in series will be in the range of 10 to 40%, more preferably at least 15%, and still more preferably at least 20%. For example, when a plurality of modules 10 like the one shown in FIG. 1 are connected in series, they have an open area of approximately 27% for the region extending from the center of one hinge pin to the center of the next hinge pin.

In the present embodiment, the transverse rib 20 has a lengthwise dimension which is much smaller than the length of the module 10 (approximately 14% of the pitch of the module 10), so it does not interfere with drainage through the module 10. However, in cases in which the central portion of a module is larger so as to occupy a greater percentage of the top surface of the module, it is possible to form drainage openings in the central portion as well. For example, instead of being a single transverse rib, the central portion could be a plate or a lattice having drainage openings formed therein.

A modular conveyor belt according to the present invention includes at least one module according to the present invention. The conveyor belt may be composed entirely of modules according to the present invention, or it may include other types of modules or other members in series with one or more modules according to the present invention.

Figure 8:
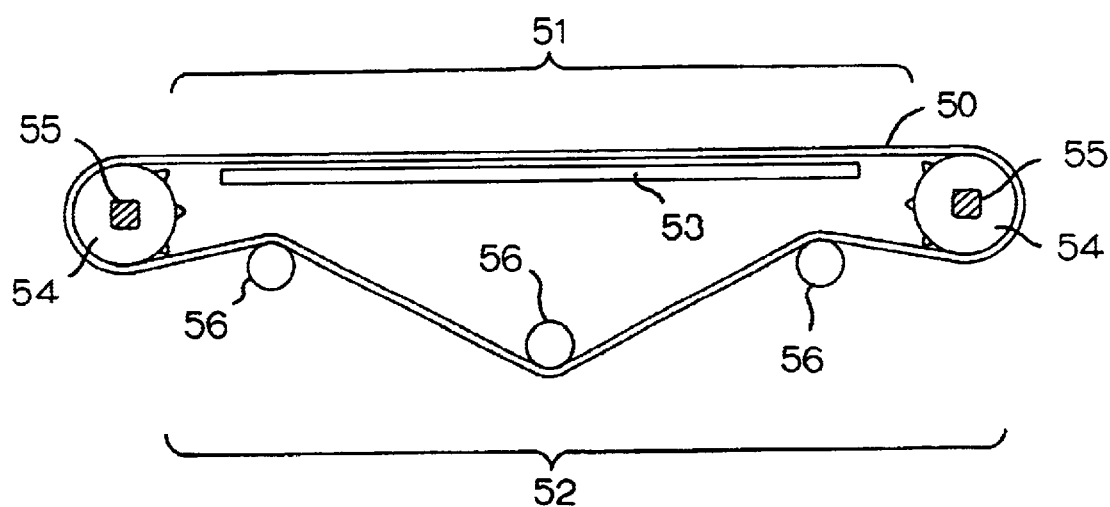
FIG. 8 is a schematic side elevation of a modular conveyor belt according to the present invention.

FIG. 8 is a simplified schematic side elevation of a portion of a typical layout of a modular conveyor belt 50 including a plurality of modules 10 according to the present invention connected in series. For simplicity, bearings for rotating shafts, a drive mechanism for powering the conveyor belt 50, and other conventional components typically part of an actual conveyor belt system have been omitted from the figure. The conveyor belt 50 travels along a path including an upper or load bearing portion 51 and a lower or return portion 52. Along the load bearing portion 51, the conveyor belt 50 usually rests on a support surface 53 which bears the weight of the conveyor belt 50 and any objects (such as fruit, vegetables, meat, or other food items) being transported by it. At the ends of the load bearing portion 51, the conveyor belt 50 passes around sprockets 54 (which may be either drive sprockets or idle sprockets) which are mounted on corresponding rotating shafts 55 and which engage with the lower surface of the modules 10 of the conveyor belt 50. On the return portion 52 of the path, the conveyor belt 50 may pass around rollers 56 for adjusting the tension or the catenary sag of the conveyor belt 50.

When a conveyor belt 50 is traveling along a portion of the path having a constant slope, such as along a horizontal region of the load bearing portion 51 of the path, adjoining modules 10 are usually coplanar with each other. FIG. 5 is a side elevation of two adjoining modules 10 in a coplanar state as they would appear when traveling along a region of constant slope. However, at certain other portions of the path, such as where the conveyor belt 50 passes around one of the rollers 56 on the return portion 52 of the path or at a transition between a level region and an upwardly sloping region of the path, adjoining modules 10 may be pivoted with respect to each other into roughly the shape of a V such that the angle between the top surfaces of adjoining modules 10 is less than 180 degrees. Such pivoting will be referred to as reverse pivoting. FIG. 6 is a side elevation of the two modules 10 of FIG. 5 undergoing reverse pivoting.

In existing conveyor belt modules with projections on their top surfaces, the projections must be set back from the lengthwise ends of the modules by a significant distance to prevent the projections from interfering with reverse pivoting. This results in a very uneven distribution of projections over the surface of a module, with the distribution being much lower in the vicinity of the lengthwise ends of a module than at the center of the module.

In the embodiment of FIG. 1, however, the projections 40 can be mounted on the extreme outer ends of the first and second lengthwise ribs 30 and 35 without the projections 40 interfering with reverse pivoting of adjoining modules 10. For example, as shown in FIG. 5, the top surface of the outermost projection 40 on each first lengthwise rib 30 extends to the outside of a plane 41 which is perpendicular to a plane containing the axes of the bores 31 at each end of a module 10, i.e., the top surface (in this example the entire top surface) of each of the outermost projections 40 at the front end of a module 10 extends forward of the axes of the bores 31 at the front end of the module 10, and the top surface (in this example the entire top surface) of each of the outermost projections 40 at the rear end of a module 10 extends rearward of the axes of the bores 31 at the rear end of the module 10. In addition, as shown in FIGS. 4 and 5, when two modules 10 are connected in series and are coplanar, the front edge of the top surface of the outermost projection 40 on each first lengthwise rib 30 at the front end of a module 10 extends at least as far forward as the midpoint of the top surface of a plurality of the projections 40 on the module 10 in front of it. In this embodiment, the top surface of the outermost projection 40 on each first lengthwise rib 30 on one module 10 extends completely forward of the top surfaces of a plurality of the projections 40 on the adjoining module 10 in front of it. More specifically, if the modules 10 are assumed to be traveling to the left in these figures, the rear edge 40e of the top surface of the outermost projection 40 on each of the first lengthwise ribs 30 at the front end of one module 10 extends forward of the front edge 40f of the top surface of the outermost projection 40 on each of the first lengthwise ribs 30 at the rear end of the adjoining module 10.

Since the projections 40 can be formed on the outer ends of the ribs 30, 35 of a module 10, the distribution of the projections 40 on a module 10 can be much more uniform than for existing modules with projections. The uniformity of the disposition of the projections 40 can be expressed in different ways. One way is in terms of the variation in the lengthwise pitch between two projections 40 which overlap each other in the widthwise direction of a module 10 (such as being aligned with each other in the lengthwise direction) and adjoin each other in the lengthwise direction, such as projections 40a and 40b or 40c and 40d in FIG. 4 which are aligned with each other in the lengthwise direction of the modules 10. The pitch 44 between two such projections on different modules 10 (such as between projections 40a and 40b) is preferably no more than 75% and more preferably no more than 50% greater than the pitch 45 between two projections 40 on the same module 10 (such as between projections 40c and 40d). Expressed as a length, the variation in the lengthwise pitch between adjoining projections 40 is preferably less than 0.15 inches and more preferably less than 0.10 inches. An example of a lengthwise pitch between adjoining projections 40 in the present embodiment is 0.32 inches for two projections 40 on the same module 10 and 0.395 inches (a difference of 0.075 inches or approximately 24% larger) for adjoining projections 40 on two different modules 10 arranged in series. In contrast, in existing modules with projections, the lengthwise pitch between the outermost projections on one module and the closest projections on an adjoining module may be as much as 100% greater than the lengthwise pitch between adjoining projections on a single module.

Another way to express the uniformity of the distribution of projections 40 is in terms of the variation in the minimum diameter of a sphere which can be supported atop a plurality of the projections 40 without contacting the top surface of the ribs of the module 10. Preferably the minimum diameter varies by no more than 0.15 inches and more preferably by no more than 0.10 inches with respect to the smallest value of the minimum diameter over the length of a module 10. In the example of FIG. 4 having the above-described lengthwise pitch of 0.32 and 0.395 inches between adjoining projections 40 and a uniform widthwise pitch between projections on adjoining lengthwise ribs of 0.33 inches, the minimum diameter of such a sphere ranges from 0.3 inches in the interior region of the module 10 to 0.35 inches in the region spanning two adjoining modules 10 connected in series. This is a variation of only 0.05 inches (approximately 17%) with respect to the smaller value of 0.3 inches. Thus, good uniformity is obtained over the length of a module 10. Small food items such as shelled peas, individual kernels of corn, and diced carrots typically have maximum dimensions of greater than 0.35 inches, so the projections 40 on this module 10 can easily support such items, including when in a wet state, anywhere over the length of a module 10, including in a region spanning two modules 10 adjoining each other in the lengthwise direction of a conveyor belt while maintaining an air gap between the items and the top surface of the ribs of the modules 10.

Despite the projections 40 being disposed on the outer ends of the lengthwise ribs 30 and 35, adjoining modules 10 can undergo significant reverse pivoting with respect to each other. The length of each of the second lengthwise ribs 35 is selected so that the outer end can pass completely over the outermost projection 40 on the outer end of the opposing first lengthwise rib 30 of the adjoining module 10 as the two modules undergo reverse pivoting with respect to each other. Instead of having a vertical surface, the outer end of each second lengthwise rib 35 is preferably curved between its upper and lower surfaces as viewed from the side as in FIG. 5 so as to extend the upper surface of the second lengthwise rib 35 towards the adjoining module 10 and enable the outermost projection 40 on the second lengthwise rib 35 to be placed closer to the outermost projection 40 on the opposing first lengthwise rib 30 of the adjoining module 10. In general, the capability of having a large angle of reverse pivoting is desirable because it enables a conveyor belt to bend backwards around smaller diameter rollers in the return portion of the travel path of the conveyor belt. Preferably adjoining modules can undergo reverse pivoting with respect to each other by at least 40 degrees and more preferably by at least 60 degrees. In the example illustrated in FIG. 6, two modules 10 can undergo reverse pivoting by approximately 73 degrees, at which point the outer end of the second lengthwise rib 35 contacts the second projection from the end of the opposing first lengthwise rib 30.

Figure 7:
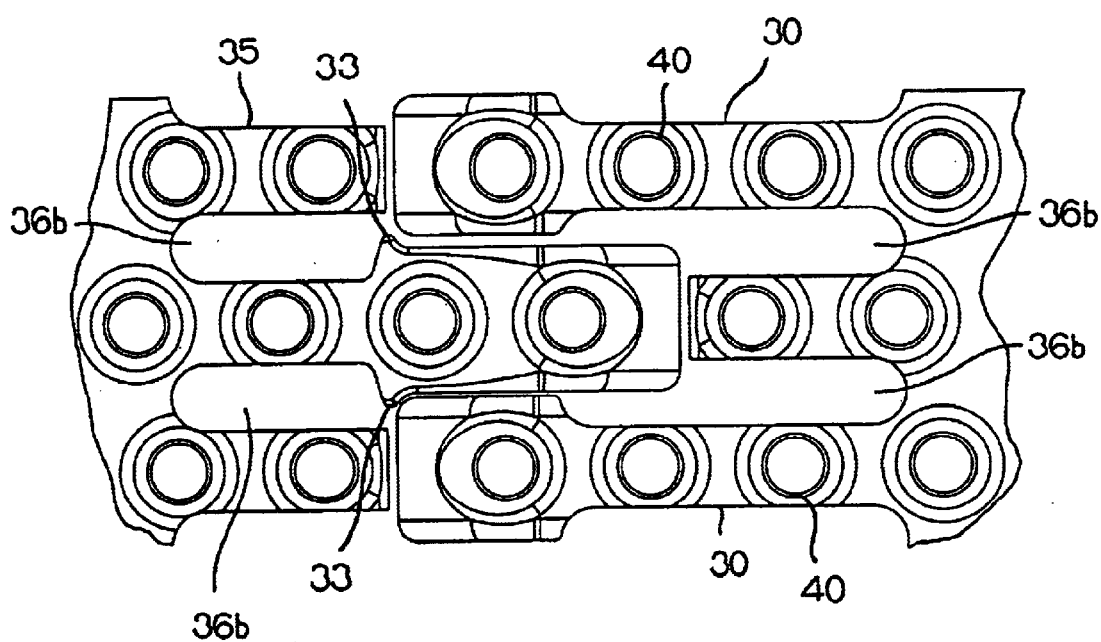
FIG. 7 is an enlarged view of region 7 in FIG. 4.

The module 10 of FIG. 1 may include one or more stopping members for use in positioning adjoining modules 10 with respect to each other when assembling a conveyor belt according to the present invention. A plurality of the first lengthwise ribs 30 on each lengthwise side of the transverse rib 20 have a stopping member in the form of a lateral projection 33 extending from each of their widthwise sides into the space between them and the adjoining first lengthwise rib 30. FIG. 7 is an enlarged view of region 7 in FIG. 4 showing two of the lateral projections 33 in detail. When two modules 10 are combined so that the first lengthwise ribs 30 on one module 10 are inserted between the first lengthwise ribs 30 on the other module 10, the two modules 10 can be moved towards each other until each lateral projection 33 on one module 10 is contacted by the outer end of one of the first lengthwise ribs 30 of the adjoining module 10. The size of each lateral projection 33 is such that when this contact occurs, the modules 10 are prevented from further movement towards each other in the lengthwise direction. When contact between the first lengthwise ribs 30 and the lateral projections 33 takes place, the bores 31 in the outer ends of the first lengthwise ribs 30 of both modules 10 are aligned with each other so that a hinge pin can be easily passed through the aligned bores 31 to connect the two modules 10 with each other.

The number of first lengthwise ribs 30 equipped with a lateral projection 33 is preferably selected such that a pair of modules 10 adjoining each other in the lengthwise direction of a conveyor belt have contact between a lateral projection 33 on one module 10 and a first lengthwise rib 30 of the adjoining module 10 at one or more locations along their width. In this embodiment, every third one of the first lengthwise ribs 30 is equipped with two of the lateral projections 33 on its opposite widthwise sides. With this arrangement, each of the first lengthwise ribs 30 which is not equipped with a lateral projection 33 contacts one of the lateral projections 33 on the adjoining module 10 when the two modules 10 are connected to each other.

Figure 9:
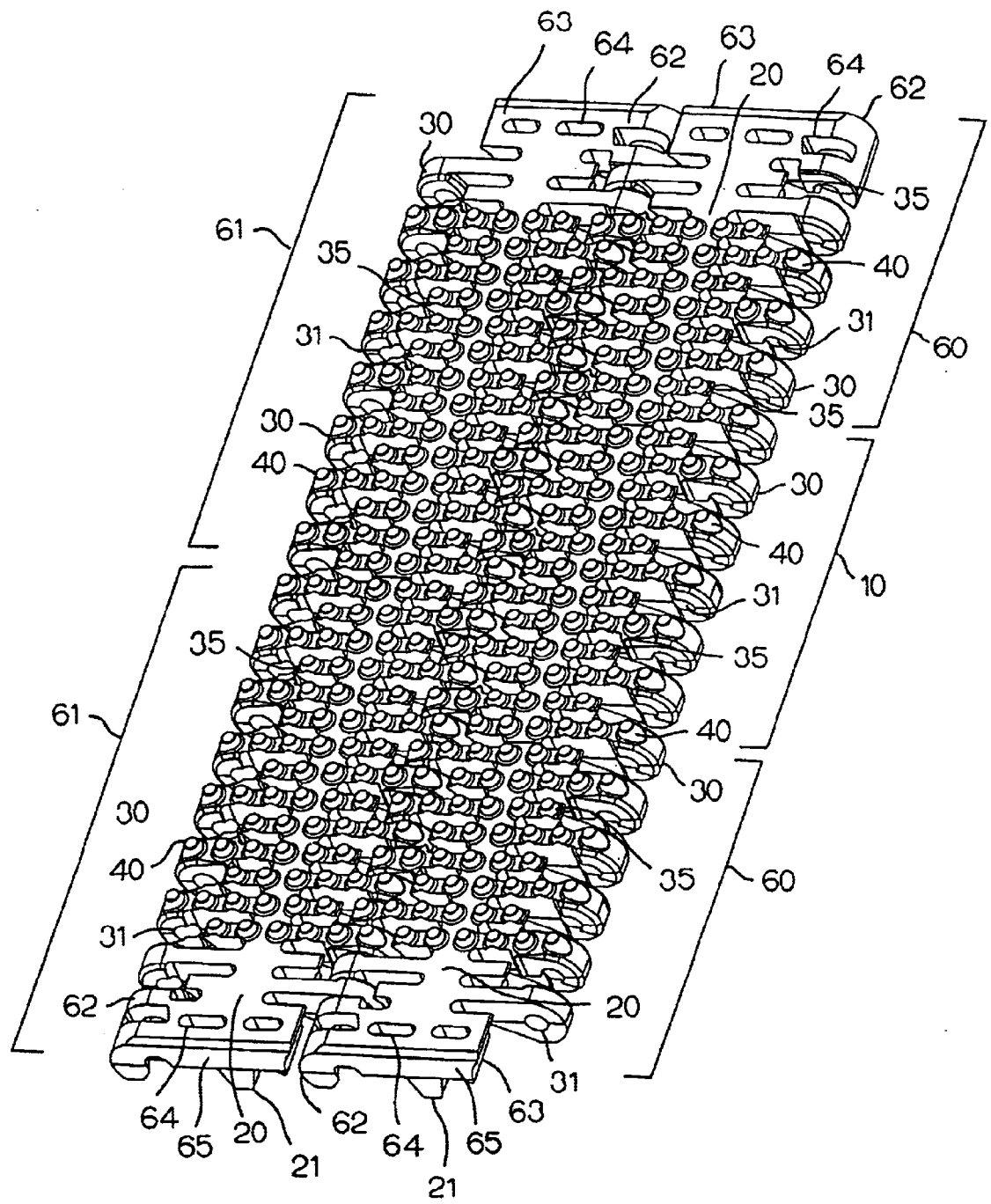
FIG. 9 is an axonometric view of two rows of a modular conveyor belt according to the present invention including interior modules and edge modules.

A modular conveyor belt according to the present invention may be formed entirely from modules 10 like those shown in FIGS. 1–7. However, in many cases, these modules 10 will be used as so-called "interior modules" which are disposed in portions of a conveyor belt which are spaced from the widthwise ends of the conveyor belt, and so-called "edge modules" will be disposed at the widthwise ends of the conveyor belt. FIG. 9 illustrates a portion of a conveyor belt according to the present invention including modules 10 used as interior modules and further including a plurality of edge modules 60 and 61. The conveyor belt includes a plurality of rows (only two of which are shown in the figure) disposed in series, each row comprising a plurality of modules disposed side by side in the widthwise direction of the conveyor belt. The righthand row in the figure includes two edge modules 60 on the left and right sides of the conveyor belt and an interior module 10 disposed between and side by side with the edge modules 60. The interior module 10 has the same structure as the modules 10 of FIGS. 1–7 except for having a smaller width (a width of 4 inches as opposed to 6 inches in FIGS. 1–7), but the width of the module 10 can be selected in accordance with the desired width of the conveyor belt. The lefthand row includes two edge modules 61 disposed side by side and no interior module 10. The edge modules 60 in the righthand row are similar in structure to the edge modules 61 in the lefthand row except for being narrower as measured in the widthwise direction of the conveyor belt. Like the interior modules 10, each of the edge modules 60 and 61 includes a transverse rib 20 and a plurality of first lengthwise ribs 30 and second lengthwise ribs 35 having the same structure as the transverse rib 20 and lengthwise ribs 30 and 35, respectively, of the interior module 10. A downward projection 21 corresponding to the projection 21 on the interior module 10 extends from the lower surface of each transverse rib 20. Projections 40 corresponding to the projections 40 on the interior module 10 are provided on the upper surface of the transverse rib 20 and lengthwise ribs 30 and 35 of the edge modules 60 and 61 with the same spacing as on the interior module 10. The projections 40 may extend all the way to the widthwise ends of the edge modules 60 and 61. However, in some conveyor belt arrangements, on the return portion of a travel path of a conveyor belt, the conveyor belt rests on elongated support bars in sliding contact with the upper surface of the edge modules at the widthwise ends of the conveyor belt. In such arrangements, projections 40 could be abraded by contact with the support bars. Therefore, in the present embodiment, projections 40 are omitted from the regions of the edge modules 60, 61 adjoining the widthwise ends of the conveyor belt. At its outer widthwise end, each of the edge modules 60, 61 has a third lengthwise rib 62 having substantially the same side profile as the first lengthwise ribs 30 but a greater width, and a fourth lengthwise rib 63 having substantially the same side profile as the second lengthwise ribs 35 and the same width as the third lengthwise rib 62. One or more drainage openings 64 may be formed in the top surface of the third and fourth lengthwise ribs 62 and 63 to provide drainage of fluid in the widthwise end regions of the edge modules 60 and 61. Each of the first lengthwise ribs 30 of the edge modules 60 and 61 includes a bore 31 for receiving an unillustrated hinge pin, and each of the third lengthwise ribs 62 includes a bore aligned with the bores 31 in the first lengthwise ribs 30. A lateral surface 65 at the outer widthwise end of each edge module 60 and 61 is preferably without protrusions or indentations to enable the edge modules 60, 61 to slide smoothly with respect to objects adjoining the widthwise ends of the conveyor belt. The third lengthwise ribs 62 may be constructed in a conventional manner so as to retain an end of a hinge pin passing through the aligned bores 31 in the first lengthwise ribs 30. The structure of the widthwise ends of the edges modules 60 and 61 may be similar to that of existing modules. For example, the edge modules 60 and 61 are similar in overall structure to a Series 800 Flush Grid Edge Module available from Intralox, Inc. of Harahan, La.

In order to minimize the number of different types of modules required to form a conveyor belt, the edge module 60 or 61 at one widthwise end of a row may be identical to the edge module at the opposite widthwise end of the same row but rotated by 180 degrees so as to face in the opposite lengthwise direction. For example, the edge modules 60 and 61 at the lower widthwise end of each row in FIG. 9 are arranged such that the third lengthwise ribs 62 face to the left in the figure, while the edge modules 60 and 61 at the upper widthwise end of each row are arranged such that the third lengthwise ribs 62 thereof face to the right in the figure.

In a conveyor belt comprising the modules 10, 60, and 61 shown in FIG. 9, a row of modules like the righthand row in the figure typically alternates with a row of modules like the lefthand row so that the modules are bricklayed, i.e., so that the widthwise edges of a module in one row are not aligned with the widthwise edges of a module in an adjoining row, except at the widthwise ends of each row. The width of the conveyor belt can be increased by inserting additional interior modules 10 into each row. For example, the width of the conveyor belt can be increased by the width of one interior module 10 by inserting an additional interior module 10 next to the illustrated interior module 10 in the righthand row and by inserting an interior module 10 between the two edge modules 61 in the lefthand row.

Figure 10:
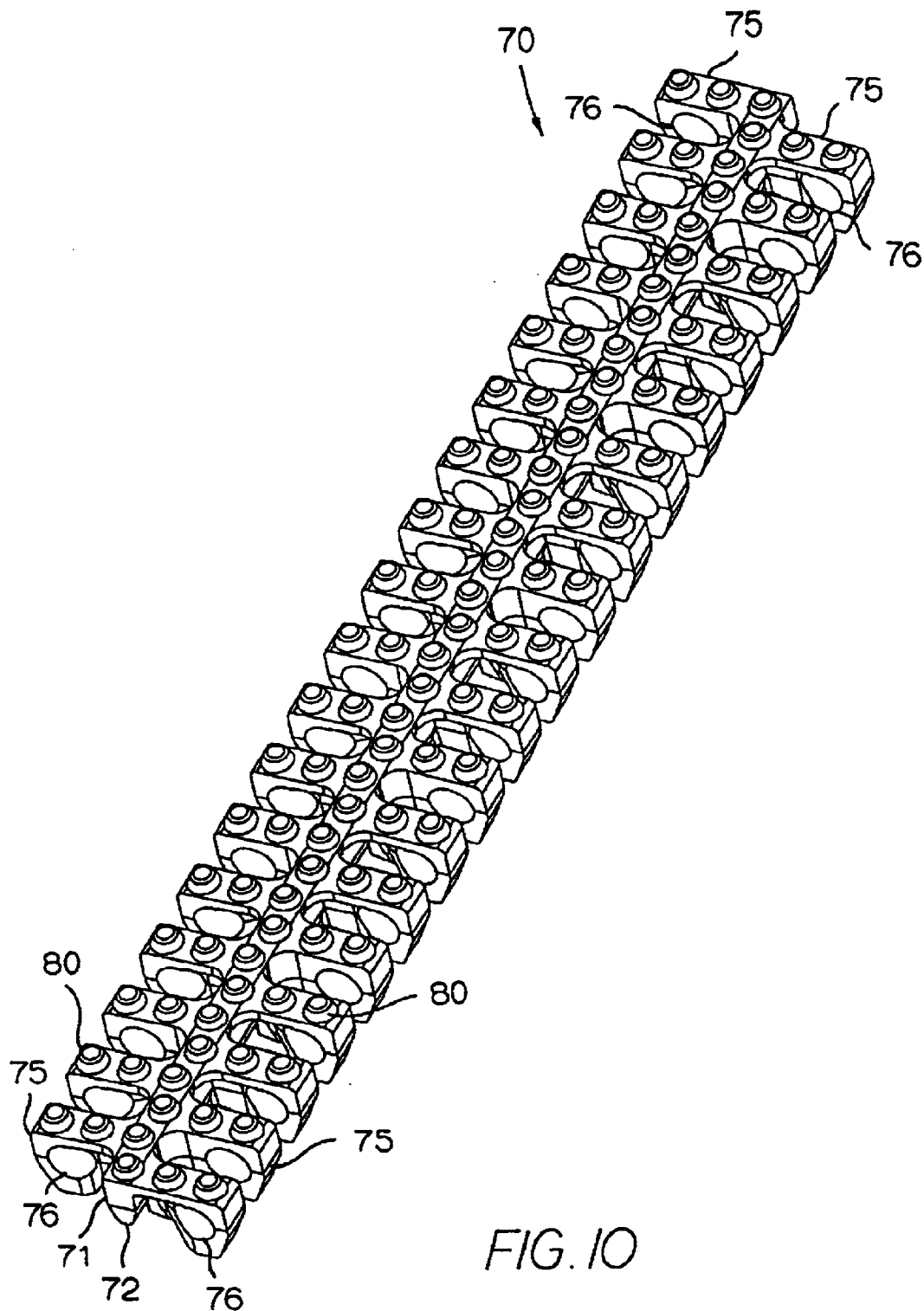
FIG. 10 is an axonometric view of another embodiment of a module of a modular conveyor belt according to the present invention.
Figure 11:
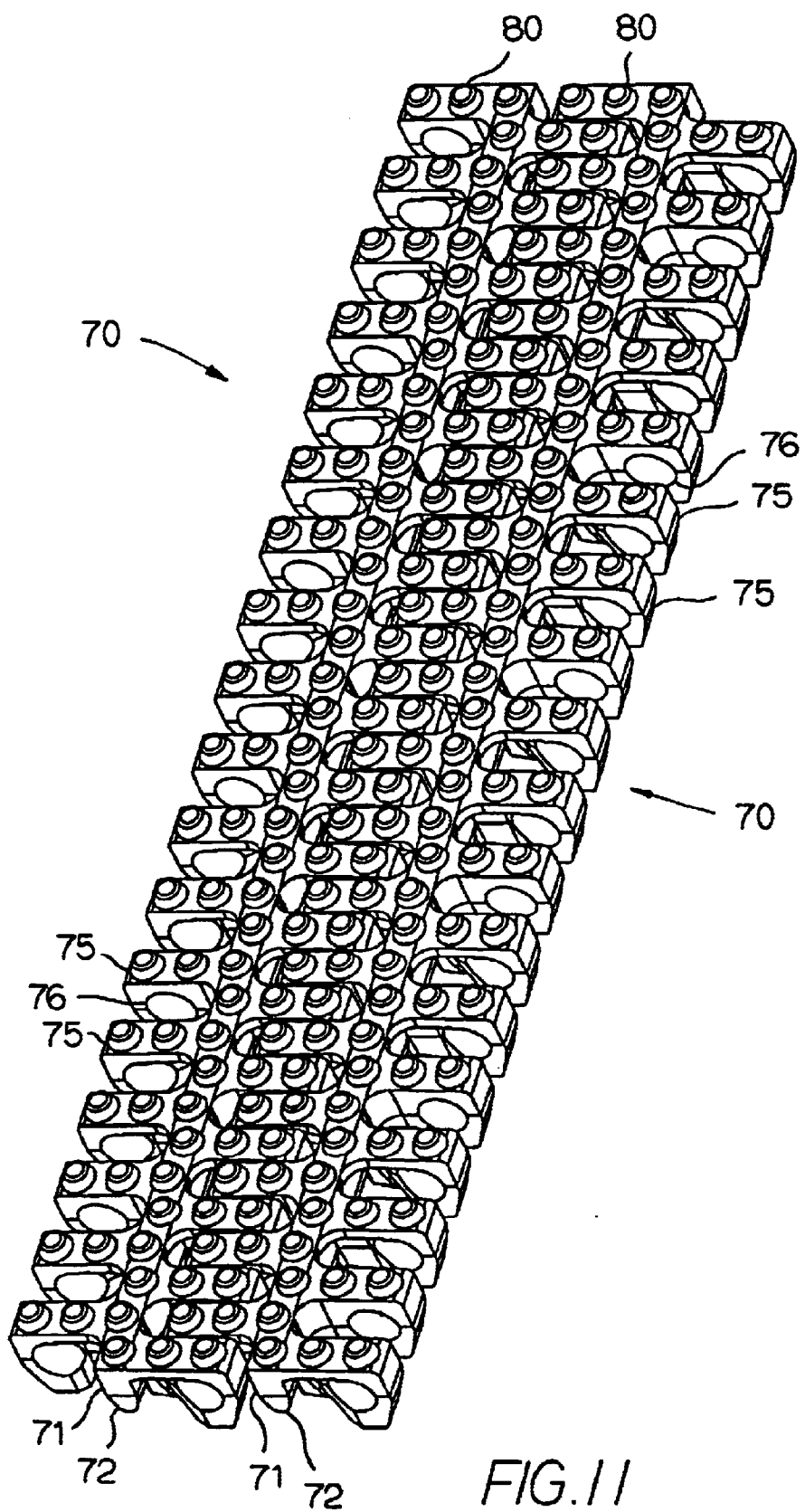
FIG. 11 is an axonometric view of two modules like the one shown in FIG. 10 connected in series.
Figure 12:
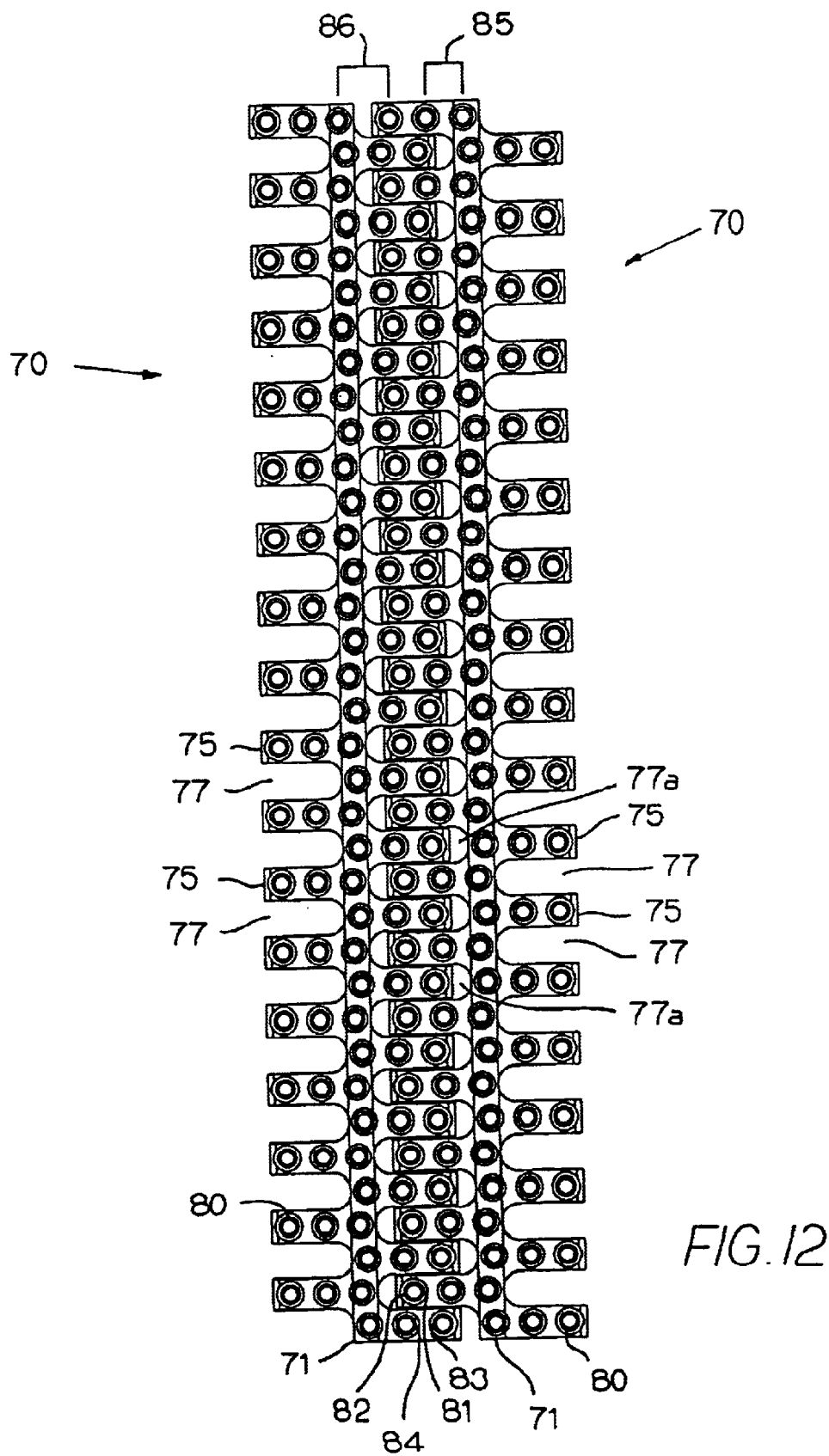
FIG. 12 is a plan view of the modules of FIG. 11.

FIG. 10 is an axonometric view of another module 70 for a modular conveyor belt according to the present invention, FIG. 11 is an axonometric view of two of the modules 70 of FIG. 10 connected in series, and FIG. 12 is a plan view of the two modules 70 of FIG. 11. Like the module 10 of FIG. 1, this module 70 is a generally rectangular grid-type module having a central portion comprising a transverse rib 71 extending in a widthwise direction of the module 70 and a plurality of lengthwise ribs 75 extending transversely (such as perpendicularly) from the transverse rib 71 in the lengthwise direction of the module 70 towards the front and rear ends of the module 70. In contrast to the module 10 of FIGS. 1–3, in this module 70, each lengthwise rib 75 is of the same length. The outer end of each lengthwise rib 75 (the end remote from the transverse rib 71) has a bore 76 formed therein for rotatably receiving a hinge pin. The lower portion of the outer end of each lengthwise rib 75 is shaped for engagement with a drive sprocket, and a projection 72 extends downwards from the underside of the transverse rib 71 for engagement with a drive sprocket. The overall geometry of the module 70, and particularly that of its lower portion, may be similar to that of an existing module. For example, the illustrated module 70 has a geometry similar to a Series 1100 Flush Grid Interior Module available from Intralox, Inc. of Harahan, La. When the module 70 is intended to be used interchangeably with a Series 1100 Flush Grid Interior Module, it will have a height of approximately 0.344 inches from the top surface of the ribs 71, 75 to its lower end and a pitch of 0.6 inches measured between the axes of the bores 76 at opposite lengthwise ends of the module 70. However, the module 70 is not restricted to any specific dimensions.

Each of the lengthwise ribs 75 has a plurality of projections 80 formed on its top surface, and the transverse rib 71 likewise has a plurality of projections 80 formed on its top surface. The projections 80 on each lengthwise rib 75 are aligned in the lengthwise direction of the module 70 with each other and with one of the projections 80 on the transverse rib 71. The dimensions and shape of the projections 80 may be the same as described with respect to FIG. 1.

Adjoining lengthwise ribs 75 are separated from each other by a gap 77 extending from the transverse rib 71 to a lengthwise end of the module 70. When adjoining modules 70 are connected in series with each other in the manner shown in FIGS. 11 and 12, the outer ends of the lengthwise ribs 75 of one module 70 are inserted into the gaps 77 between the lengthwise ribs 75 of the adjoining module 70 with the bores 76 in each module 70 aligned with the bores 76 in the adjoining module 70. The lengths of the lengthwise ribs 75 are such that when the bores 76 are aligned with each other, a space 77a which can function as a drainage opening is left in the gap 77 between the outer end of each lengthwise rib 75 and the transverse rib 71 of the adjoining module 70.

As in the previous embodiment, projections 80 are disposed on the outer ends of the lengthwise ribs 75 so that the distribution of projections 80 can have good uniformity over the length of a conveyor belt. The top surface of the outermost projection 80 on each lengthwise rib 75 extends to outside of a plane perpendicular to a plane passing through the axes of the bores 76 at opposite lengthwise ends of a module 70, i.e., the top surface (in this example the entire top surface) of each of the outermost projections 80 at the front end of a module 70 extends forward of the axes of the bores 76 at the front end of the module 70, and the top surface (in this example the entire top surface) of each of the outermost projections 80 at the rear end of a module 70 extends rearward of the axes of the bores 76 at the rear end of the module 70. As shown in FIG. 12, when two modules 70 are connected in series and are coplanar, assuming that the modules 70 are traveling to the left in the figure, the rear edge 81 of the top surface of the outermost projection 80 on each of the lengthwise ribs 75 at the front end of one module 70 (the righthand module 70 in FIG. 12) extends forward of the front edge 83 of the top surface of the outermost projection 80 on each of the lengthwise ribs 75 at the rear end of the adjoining module 70 (the lefthand module 70 in the figure). In addition, the front edge 82 of the top surface of the outermost projection 80 on each of the lengthwise ribs 75 at the front end of one module 70 (the righthand module 70) extends toward of the rear edge 84 of the top surface of the second projection 80 from the outer end on each of the lengthwise ribs 75 at the rear end of the adjoining module 70 (the lefthand module 70). In this embodiment, an example of a lengthwise pitch 85 between adjoining projections 80 in alignment with each other on a single module 70 is 0.175 inches, while the lengthwise pitch 86 between the outermost projection 80 on a lengthwise rib 75 and the adjoining projection 80 in alignment with it on the transverse rib 71 of the adjoining module 70 is 0.25 inches, or 43% larger. The minimum diameter of a sphere which can be supported atop a plurality of the projections 80 without contacting the top surface of the ribs 71, 75 of the module 70 ranges from 0.127 inches to 0.223 inches. The variation in the minimum diameter is sufficiently small that the projections 80 can easily support small food items such as shelled peas, individual kernels of corn, and diced carrots anywhere over the length of a module 70, including in a region spanning two modules 70 adjoining each other in the lengthwise direction of a conveyor belt while maintaining an air gap between the items and the top surface of the ribs of the modules 70, whether the items are in a wet or dry state.

In spite of there being projections 80 disposed at the outer ends of the lengthwise ribs 75, the modules 70 can undergo a large amount of reverse pivoting. For example, the modules 70 shown in FIGS. 11 and 12 can undergo reverse pivoting with respect to each other by approximately 105 degrees.

For the same reasons as described with respect to the projections 40 of the embodiment of FIG. 1, the projections 80 are preferably not aligned in both the lengthwise and widthwise direction of the module 70. The projections 80 on the lengthwise ribs 75 of a single module 70 are disposed in parallel rows extending in the widthwise direction of the module 70, but as shown in FIGS. 11 and 12, when two modules 70 are connected in series with each other, adjoining projections 80 in the widthwise direction of the modules 70 (whether on the same module 70 or on two different modules 70) are staggered with respect to each other in the lengthwise direction of the modules 70.

In this embodiment, each of the lengthwise ribs 75 has a constant width along its upper surface in order to provide more space for the provision of projections 80, but the width may vary over the length and/or the height of a lengthwise rib 75. For example, as shown in FIGS. 10 and 11, the width of the lengthwise ribs 75 may vary in the lengthwise direction in the lower portion of each lengthwise rib 75, being greater at the outer ends of the lengthwise ribs 75 than at their inner ends. A varying width reduces the weight of a module 70 and provides access to a hinge pin passing through the bores 76 of the lengthwise ribs 75 to facilitate cleaning of the module 70.

As is the case for the embodiment of FIGS. 1–7, a modular conveyor belt according to the present invention may be formed entirely of modules 70 like those shown in FIGS. 10–12, or it may employ these modules 70 as interior modules and may further include edge modules adjoining the widthwise ends of the conveyor belt in a manner similar to that shown in FIG. 9. An edge module may have an overall shape similar to that of an interior module 70 but with a widthwise end shaped so as to be able to slide smoothly with respect to equipment adjoining a widthwise side of the conveyor belt. For example, the widthwise end of an edge module may have the same shape as for an existing edge module, such as a Series 1100 Flush Grid Edge Module available from Intralox, Inc. of Harahan, La. In a conveyor belt employing the modules 70 of FIGS. 10–12, two modules adjoining each other in the lengthwise direction of the conveyor belt may have both of their widthwise ends aligned with each other, or the adjoining modules may be bricklayed, as described with respect to FIG. 9.

What is claimed is:

1. A module for a modular conveyor belt comprising a grid including a plurality of lengthwise ribs extending in a lengthwise direction of the module, a plurality of the lengthwise ribs each having a bore formed in its outer end for receiving a hinge pin, a plurality of projections extending upwards from a top surface of the grid for supporting objects to be transported by the module, a portion of the projections being nonoverlapping with respect to each other in the lengthwise direction of the module and a portion of the projections being nonoverlapping with respect to each other in a widthwise direction of the module, a plurality of drainage openings being provided between adjoining lengthwise ribs for drainage of fluid from objects supported on the projections.

2. A module as claimed in claim 1 wherein the grid includes a central portion extending in a widthwise direction of the module and connected to inner ends of the lengthwise ribs.

3. A module as claimed in claim 1 wherein the grid includes a transverse rib extending in a widthwise direction of the module and connected to a plurality of the lengthwise ribs.

4. A module as claimed in claim 1 wherein a plurality of the projections are provided on each lengthwise rib.

5. A module for a modular conveyor belt comprising a grid including a plurality of lengthwise ribs extending in a lengthwise direction of the module, a plurality of the lengthwise ribs each having a bore formed in its outer end for receiving a hinge pin, and a plurality of projections provided on a top surface of the grid for supporting objects to be transported by the module, each projection being stationary with respect to the grid and comprising a body of rotation about an axis extending upwards from the grid, a plurality of drainage openings being provided between adjoining lengthwise ribs for drainage of fluid from objects supported on the projections.

6. A module for a modular conveyor belt having first and second lengthwise ends, a top surface disposed between the lengthwise ends, a plurality of bores for receiving a hinge pin formed at the first and second lengthwise ends, and a plurality of projections for supporting objects to be transported by the module provided on and extending upwards from the top surface, a portion of the projections being nonoverlapping with respect to each other in a lengthwise direction of the module and a portion of the projections being nonoverlapping with respect to each other in a widthwise direction of the module, the module having an open area of at least 10%.

7. A module as claimed in claim 6 wherein the module has an open area of at least 15%.

8. A module for a modular conveyor belt having a front end and a rear end each having a plurality of aligned bores formed therein, the front end and the rear end each being shaped for interfitting with one of the ends of an identical module, and a plurality of projections on a top surface of the module, a portion of the projections being nonoverlapping with respect to each other in a lengthwise direction of the module and a portion of the projections being nonoverlapping with respect to each other in a widthwise direction of the module, a plurality of the projections extending forward of axes of the bores at the front end of the module and a plurality of the projections extending rearward of axes of the bores at the rear end of the module, wherein if the module is connected in series with an identical module with the bores at the rear end of the module aligned with the bores in the front end of the identical module, the modules can undergo reverse pivoting with respect to each other from a coplanar state by at least 40 degrees.

9. A module as claimed in claim 8 wherein an entire top surface of a plurality of the projections is disposed forward of the axes of the bores at the front end of the module and an entire top surface of a plurality of the projections is disposed rearward of the axes of the bores at the rear end of the module.

10. A module as claimed in claim 8 wherein if the module is connected in series with the identical module with the bores at the rear end of the module aligned with the bores in the front end of the identical module, a plurality of the projections on the module overlap a plurality of the projections on the identical module in the lengthwise direction of the modules.

11. A module as claimed in claim 8 wherein if the module is connected in series with the identical module with the bores at the rear end of the module aligned with the bores in the front end of the identical module, a plurality of the projections on the module have a top surface which extends in a lengthwise direction of the module to at least a midpoint of a top surface of a plurality of the projections on the identical module.

12. A module as claimed in claim 8 wherein if the module is connected in series with the identical module with the bores at the rear end of the module aligned with the bores in the front end of the identical module, an entire top surface of each of a plurality of the projections on the module is disposed to the rear of a top surface of each of a plurality of the projections on the identical module.

13. A module as claimed in claim 8 including a plurality of lengthwise ribs each extending in the lengthwise direction of the module and each having a first and a second of the projections on its top surface, the first projection being closer to an outer end of the lengthwise rib than the second projection, wherein if the module is connected in series with the identical module with the bores at the rear end of the module aligned with the bores in the front end of the identical module, the second projection overlaps a plurality of the projections on the identical module in the lengthwise direction of the modules.

14. A module for a modular conveyor belt having a plurality of projections extending upwards from a top surface thereof, a portion of the projections being nonoverlapping with respect to each other in a lengthwise direction of the module and a portion of the projections being nonoverlapping with respect to each other in a widthwise direction of the module, the module having a front end and a rear end each having a plurality of aligned bores formed therein, the front end and the rear end each being shaped for interfitting with one of the ends of an identical module, wherein if the module is connected in series with the identical module with the bores at the rear end of the module aligned with the bores in the front end of the identical module, a pitch between adjoining projections which overlap each other in the widthwise direction of the modules varies by at most 75% over a length of the modules, the modules able to undergo reverse pivoting with respect to each other from a coplanar state by at least 40 degrees.

15. A module as claimed in claim 14 wherein if the module is connected in series with the identical module with the bores at the rear end of the module aligned with the bores in the front end of the identical module, the pitch between adjoining projections which overlap each other in the widthwise direction of the modules varies by at most 50% over a length of the modules.

16. A module for a modular conveyor belt having a plurality of projections extending upwards from a top surface thereof, a portion of the projections being nonoverlapping with respect to each other in a lengthwise direction of the module and a portion of the projections being nonoverlapping with respect to each other in a widthwise direction of the module, the module having a front end and a rear end each having a plurality of aligned bores formed therein, the front end and the rear end each being shaped for interfitting with one of the ends of an identical module, wherein if the module is connected in series with the identical module with the bores at the rear end of the module aligned with the bores in the front end of the identical module, the minimum diameter of a sphere which can be supported atop a plurality of the projections without contacting the top surface varies by at most 0.15 inches over the length of the modules, the modules being able to undergo reverse pivoting with respect to each other from a coplanar state by at least 40 degrees.

17. A module as claimed in claim 16 wherein if the module is connected in series with the identical module with the bores at the rear end of the module aligned with the bores in the front end of the identical module, the minimum diameter of a sphere which can be supported atop a plurality of the projections without contacting the top surface varies by at most 0.10 inches over the length of the modules.

18. A module for a modular conveyor belt comprising a grid including a plurality of lengthwise ribs extending in a lengthwise direction of the module and separated from each other by gaps and each having an outer end having a bore formed therein for receiving a hinge pin, at least two of the lengthwise ribs each having a stopping member extending in a widthwise direction of the module partway into the gap between it and an adjoining lengthwise rib without contacting the adjoining lengthwise rib.

19. A method of assembling a modular conveyor belt comprising inserting each of two lengthwise ribs of a first module having a plurality of lengthwise ribs into a different gap between lengthwise ribs of a second module comprising a module as claimed in claim 18 until each of the two lengthwise ribs of the first module contacts a different one of the stopping members of the second module to bring a plurality of bores in the first module into alignment with a plurality of the bores in the second module; and inserting a hinge pin through the aligned bores to pivotably connect the two modules to each other.

20. A method of operating a modular conveyor belt having a plurality of modules connected in series and forming a surface with modules adjoining each other in a lengthwise direction of the conveyor belt being able to undergo reverse pivoting with respect to each other from a coplanar state by at least 40 degrees, comprising supporting a plurality of items of food having a maximum dimension of at most 0.5 inch atop projections above the surface of the modules with an air gap between a lower the surface of the items and surfaces of the modules on which the projections are formed, with a plurality of the items spanning two adjoining modules.

21. A method as claimed in claim 20 comprising supporting a plurality of items of food having a maximum dimension of at most 0.4 inches atop projections of the modules with an air gap between a lower surface of the items and surfaces of the modules on which the projections are formed, with a plurality of the items spanning two adjoining modules.

22. A method as claimed in claim 20 including draining water from the items of food through drainage openings in the modules.

23. A method as claimed in claim 20 wherein the items of food are selected from shelled peas, individual kernels of corn, and diced carrots.

* * * * *